United States Patent
Bamberg

(10) Patent No.: US 6,628,585 B1
(45) Date of Patent: Sep. 30, 2003

(54) QUADRAPHONIC COMPACT DISC SYSTEM

(76) Inventor: Thomas Bamberg, Wrightwood Road House # 129 P.O. Box 624, North, SC (US) 29112

( * ) Notice: Subject to any disclaimer, the term of this patent is extended or adjusted under 35 U.S.C. 154(b) by 440 days.

(21) Appl. No.: 09/687,080

(22) Filed: Oct. 13, 2000

(51) Int. Cl.$^7$ .................................................. G11B 5/09
(52) U.S. Cl. ............................... 369/47.16; 369/47.23; 369/53.37
(58) Field of Search .......................... 369/47.16, 47.23, 369/47.24, 47.15, 59.25, 59.26, 275.3, 275.4, 111, 53.24, 53.29, 53.37, 53.33, 53.13; 84/609, 610, 602, 615, 634, 622, 626; 381/1, 18, 17, 24

(56) References Cited

U.S. PATENT DOCUMENTS

| | | |
|---|---|---|
| 4,139,871 A | 2/1979 | Yoshida et al. |
| 4,158,480 A | 6/1979 | Mitchell |
| 4,618,950 A * | 10/1986 | Abe et al. ................. 369/30.12 |
| 4,872,151 A | 10/1989 | Smith |
| 5,506,825 A | 4/1996 | Gushima et al. |
| 5,661,702 A | 8/1997 | Barrett |
| 5,912,976 A | 6/1999 | Klayman et al. |
| 5,991,243 A * | 11/1999 | Ishi et al. ................. 369/53.22 |
| 6,031,808 A * | 2/2000 | Ueno ........................ 369/111 |

FOREIGN PATENT DOCUMENTS

| | | | |
|---|---|---|---|
| JP | 09271095 A | * | 10/1997 |
| JP | 11215588 A | * | 8/1999 |

* cited by examiner

Primary Examiner—Thang V. Tran

(57) ABSTRACT

A quadraphonic compact disc system for providing enhanced acoustic imaging of sound reproductions. The quadraphonic compact disc system includes a compact disc with data streams representing at least four audio channels, a compact disc player assembly designed for reading the data streams when the compact disc is placed in the compact disc player assembly, a plurality of speakers electrically coupled to the compact disc player assembly and an audio switching assembly designed for directing a plurality of electrical signals from the compact disc player to an associated one of the plurality of speakers.

8 Claims, 4 Drawing Sheets

QUADRAPHONIC COMPACT DISC SYSTEM

BACKGROUND OF THE INVENTION

1. Field of the Invention

The present invention relates to multi-track audio systems and more particularly pertains to a new quadraphonic compact disc system for providing enhanced acoustic imaging of sound reproductions.

2. Description of the Prior Art

The use of multi-track audio systems is known in the prior art. More specifically, multi-track audio systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,912,976; U.S. Pat. No. 4,872,151; U.S. Pat. No. 5,661,702; U.S. Pat. No. 4,158,480; U.S. Pat. No. 5,506,825; and U.S. Pat. No. 4,139,871.

While these devices fulfill their respective, particular objectives and requirements, the aforementioned patents do not disclose a new quadraphonic compact disc system. The inventive device includes a compact disc with data streams representing at least four audio channels, a compact disc player assembly designed for reading the data streams when the compact disc is placed in the compact disc player assembly, a plurality of speakers electrically coupled to the compact disc player assembly and an audio switching assembly designed for directing a plurality of electrical signals from the compact disc player to an associated one of the plurality of speakers.

In these respects, the quadraphonic compact disc system according to the present invention substantially departs from the conventional concepts and designs of the prior art, and in so doing provides an apparatus primarily developed for the purpose of providing enhanced acoustic imaging of sound reproductions.

SUMMARY OF THE INVENTION

In view of the foregoing disadvantages inherent in the known types of multi-track audio systems now present in the prior art, the present invention provides a new quadraphonic compact disc system construction wherein the same can be utilized for providing enhanced acoustic imaging of sound reproductions.

The general purpose of the present invention, which will be described subsequently in greater detail, is to provide a new quadraphonic compact disc system apparatus and method which has many of the advantages of the multi-track audio systems mentioned heretofore and many novel features that result in a new quadraphonic compact disc system which is not anticipated, rendered obvious, suggested, or even implied by any of the prior art multi-track audio systems, either alone or in any combination thereof.

To attain this, the present invention generally comprises a compact disc with data streams representing at least four audio channels, a compact disc player assembly designed for reading the data streams when the compact disc is placed in the compact disc player assembly, a plurality of speakers electrically coupled to the compact disc player assembly and an audio switching assembly designed for directing a plurality of electrical signals from the compact disc player to an associated one of the plurality of speakers.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be.understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and-the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new quadraphonic compact disc system apparatus and method which has many of the advantages of the multi-track audio systems mentioned heretofore and many novel features that result in a new quadraphonic compact disc system which is not anticipated, rendered obvious, suggested, or even implied by any of the prior art multi-track audio systems, either alone or in any combination thereof.

It is another object of the present invention to provide a new quadraphonic compact disc system which may be easily and efficiently manufactured and marketed.

It is a further object of the present invention to provide a new quadraphonic compact disc system which is of a durable and reliable construction.

An even further object of the present invention is to provide a new quadraphonic compact disc system which is susceptible of a low cost of manufacture with regard to both materials and labor, and which accordingly is then susceptible of low prices of sale to the consuming public, thereby making such quadraphonic compact disc system economically available to the buying public.

Still yet another object of the present invention is to provide a new quadraphonic compact disc system which provides in the apparatuses and methods of the prior art some of the advantages thereof, while simultaneously overcoming some of the disadvantages normally associated therewith.

Still another object of the present invention is to provide a new quadraphonic compact disc system for providing enhanced acoustic imaging of sound reproductions.

Yet another object of the present invention is to provide a new quadraphonic compact disc system which includes a compact disc with data streams representing at least four audio channels, a compact disc player assembly designed for reading the data streams when the compact disc is placed in the compact disc player assembly, a plurality of speakers electrically coupled to the compact disc player assembly and an audio switching assembly designed for directing a plurality of electrical signals from the compact disc player to an associated one of the plurality of speakers.

Still yet another object of the present invention is to provide a new quadraphonic compact disc system that is compatible with existing compact discs.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
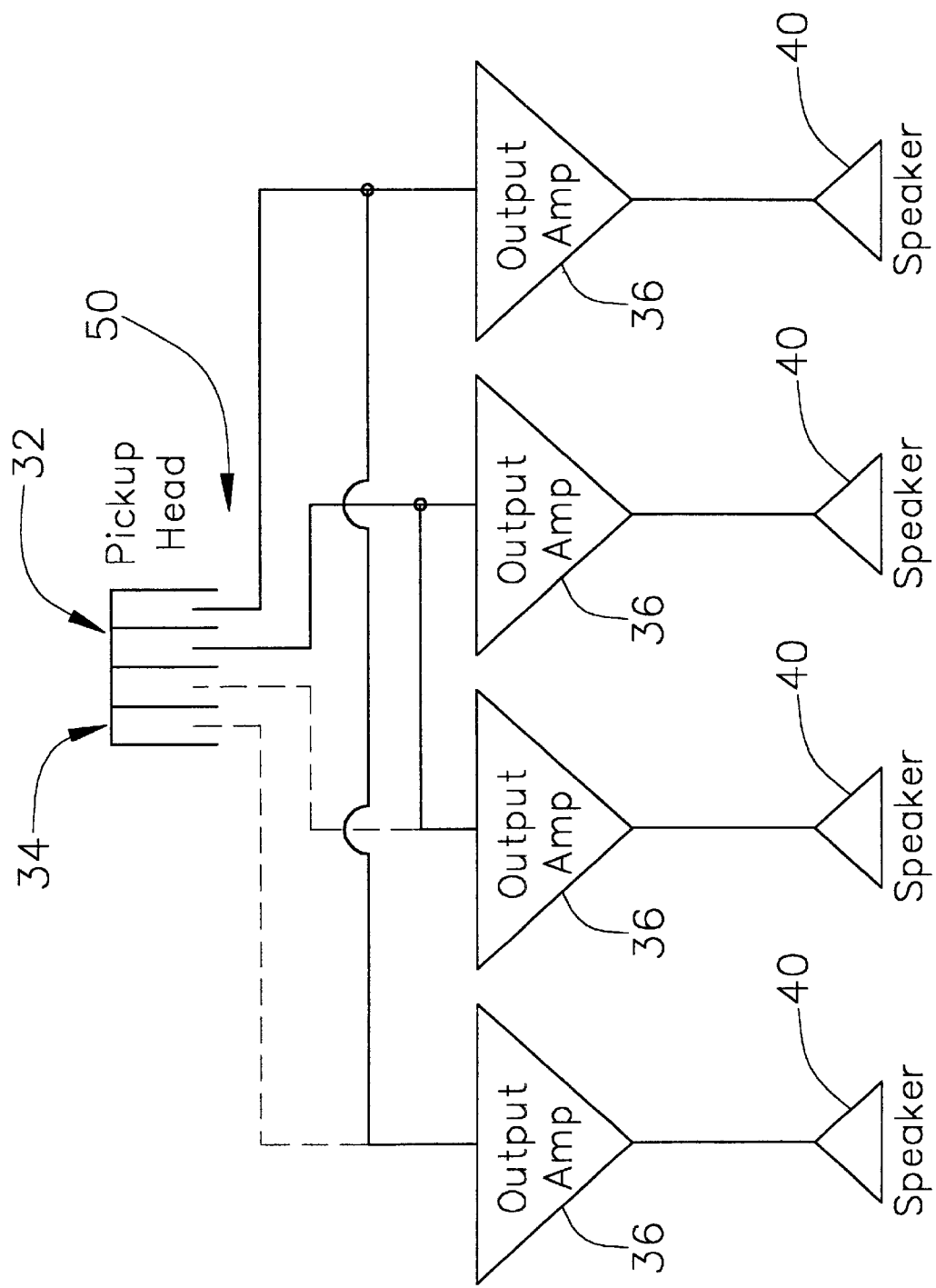
FIG. 1 is a schematic block diagram of the pick-up heads and output amplifiers of a new quadraphonic compact disc system according to the present invention.
Figure 2:
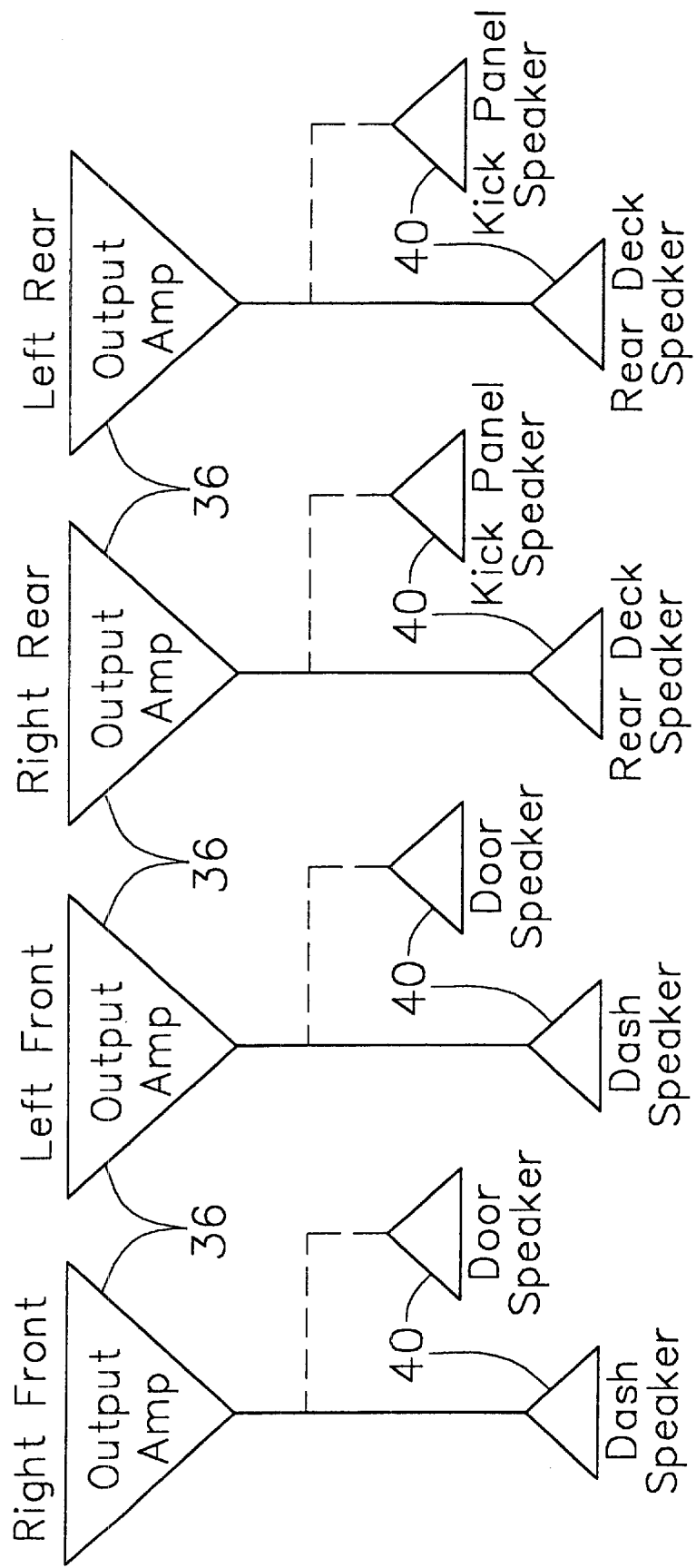
FIG. 2 is a schematic block diagram of a pairing of amplifiers and speakers in an embodiment of the present invention.
Figure 3:
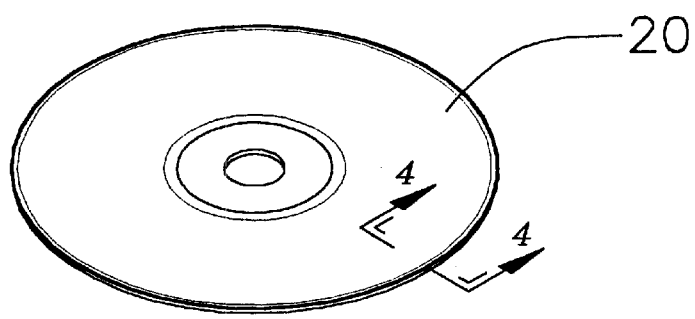
FIG. 3 is a schematic perspective view of a compact disc of the present invention.
Figure 4:
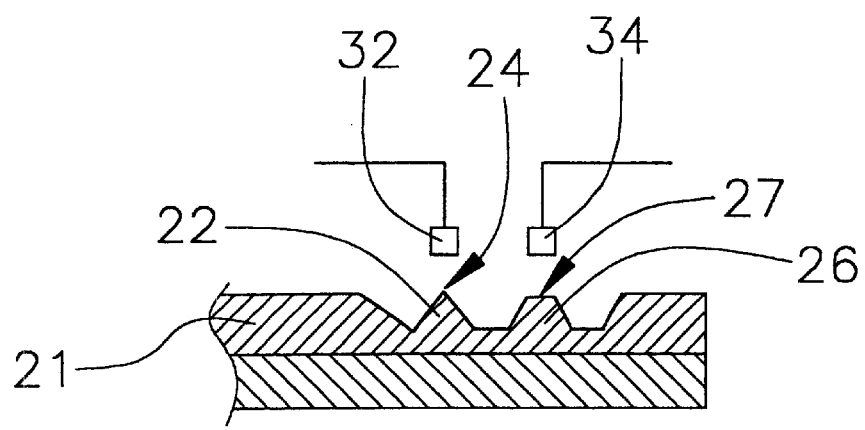
FIG. 4 is a schematic cross-sectional view of the present invention taken along line 4—4 of FIG. 3.
Figure 5:
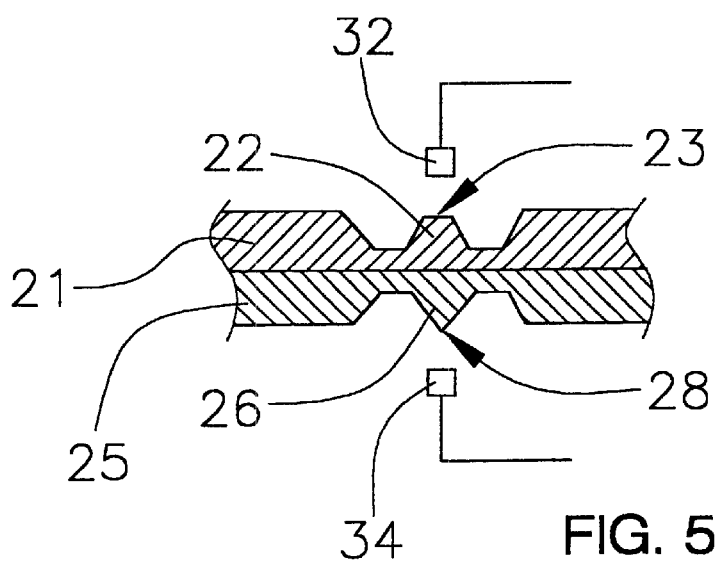
FIG. 5 is a schematic cross-sectional view of an embodiment of the present invention taken along line 4—4 of FIG. 3.
Figure 6:
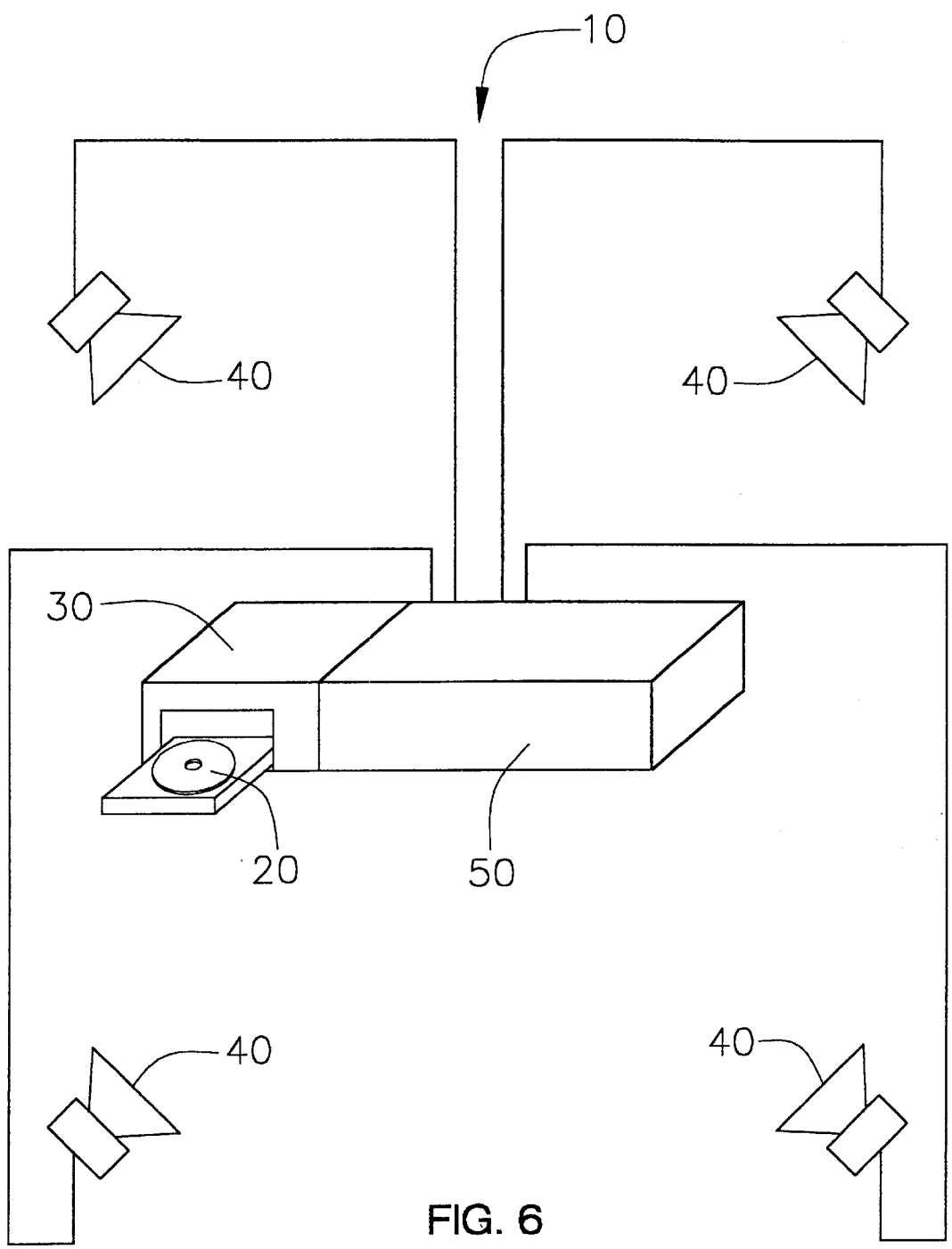
FIG. 6 is a schematic perspective view of the present invention.

With reference now to the drawings, and in particular to FIGS. 1 through 6 thereof, a new quadraphonic compact disc system embodying the principles and concepts of the present invention and generally designated by the reference numeral 10 will be described.

As best illustrated in FIGS. 1 through 6, the quadraphonic compact disc system 10 generally comprises a compact disc 20, a compact disc player assembly 30, a plurality of speakers 40, and an audio switching assembly 50.

The compact disc 20 has data streams representing at least four audio channels.

The compact disc player assembly 30 is designed for reading the data streams of the compact disc 20 when the compact disc 20 is placed,substantially within the compact disc player assembly 30.

The plurality of speakers 40 is electrically coupled to the compact disc player assembly 30 and designed for reproducing sound from electrical signals.

The audio switching assembly 50 is designed for directing a plurality of electrical signals from the compact disc player assembly 30 to an associated one of the plurality of speakers 40.

An aluminum layer 21 is dispersed across a surface of the compact disc 20. The aluminum layer 21 includes a ridge 22 substantially positioned as to form a spiral extending from a central portion of the compact disc 20 to an outer edge of the compact disc 20. The aluminum ridge 22 includes pits 23 and lands 24 positioned along a length of the aluminum ridge 22. The pits 23 and lands 24 represent binary information corresponding to an audio signal. The pits 23 and lands 24 represent a first and second audio channels.

A second aluminum ridge 26 includes pits 27 and lands 28 representing a third and fourth audio channels.

In an embodiment the second aluminum ridge 26 is positioned substantially parallel to the ridge 22 and extends from a central portion of the compact disc 20 to an outer edge of the compact disc 20.

In a further embodiment the compact disc 20 includes-a second aluminum layer 25 positioned on a second side of the compact disc 20. The second aluminum ridge 26 is positioned on the second aluminum layer 25 such that the aluminum layer 21 is positioned on a first side of the compact disc 20 and the second aluminum layer 25 is positioned on a second side of the compact disc 20.

The compact disc player assembly 30 includes a first 32 and second pick-up head 34. The first pick-up head 32 is designed for reading the pits 23 and lands 24 of the ridge 22 representing the first and second audio channels. The second pickup head 34 is designed for reading the pits 27 and lands 28 of the second aluminum ridge 26 representing the third and fourth audio channels.

Each one of the plurality of audio amplifiers 36 is for amplifying an associated electrical signal from a pick-up head 32,34 for driving an associated one of the plurality of speakers 40.

In an embodiment the audio switching assembly 50 monitors an output of the second pick-up head 34. The audio switching assembly 50 connects the speaker 40 associated with the third audio channel to the first audio output when no signal is presented by the second pick-up head 34. The audio switching assembly 50 connects the speaker 40 associated with the fourth audio channel to the second audio output when no signal is presented by the second pick-up head 34.

In an embodiment the plurality of speakers 40 includes two speakers per audio channel. Thus an enhanced reproduction of an audio image is provided to the user.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A quadraphonic compact disc system comprising:

a compact disc with data streams representing at least four audio channels;

a compact disc player assembly adapted for reading said data streams of said compact disc when said compact disc is placed substantially within said compact disc player assembly;

a plurality of speakers electrically coupled to said compact disc player assembly and adapted for reproducing sound from electrical signals;

an audio switching assembly adapted for directing a plurality of electrical signals from said compact disc player assembly to an associated one of said plurality of speakers;

wherein said compact disc further comprises an aluminum layer, said aluminum layer being dispersed across a surface of said compact disc, said aluminum layer having a ridge substantially positioned as to form a spiral extending from a central portion of said compact disc to an outer edge of said compact disc, said aluminum ridge having pits and lands positioned along a length of said aluminum ridge, said pits and lands representing binary information corresponding to an audio signal; and wherein said compact disc further comprises a second aluminum ridge, said ridge having pits and lands representing a first and second audio channels, said second aluminum ridge having pits and lands representing a third and fourth audio channels.

2. The quadraphonic compact disc system of claim 1, wherein said second aluminum ridge being positioned substantially parallel to said ridge and extending from a central portion of said compact disc to an outer edge of said compact disc.

3. The quadraphonic compact disc system of claim 1, wherein said compact disc having a second aluminum layer positioned on a second side of said compact disc, said second aluminum ridge being positioned on said second aluminum layer such that said aluminum layer is positioned on a first side of said compact disc and said second aluminum layer is positioned on a second side of said compact disc.

4. The quadraphonic compact disc system of claim 1, wherein said compact disc player assembly further comprises a first and second pick-up head, said first pick-up head being adapted for reading said pits and lands of said ridge representing said first and second audio channels;

said second pickup head being adapted for reading said pits and lands of said second aluminum ridge representing said third and fourth audio channels.

5. The quadraphonic compact disc system of claim 1, wherein said compact disc player assembly further comprises a plurality of audio amplifiers, each one of said audio amplifiers being for amplifying an associated electrical signal from a pick-up head for driving an associated one of said plurality of speakers.

6. The quadraphonic compact disc system of claim 1, wherein said audio switching assembly monitors an output of said second pick-up head; said audio switching assembly connecting said speaker associated with said third audio channel to said first audio output when no signal is presented by said second pick-up head, said audio switching assembly connecting said speaker associated with said fourth audio channel to said second audio output when no signal is presented by said second pick-up head.

7. The quadraphonic compact disc system of claim 1, wherein said plurality of speakers includes two speakers per audio channel whereby an enhanced reproduction of an audio image is provided to the user.

8. A quadraphonic compact disc system comprising:

a compact disc with data streams representing at least four audio channels;

a compact disc player assembly adapted for reading said data streams of said compact disc when said compact disc is placed substantially within said compact disc player assembly;

a plurality of speakers electrically coupled to said compact disc player assembly and adapted for reproducing sound from electrical signals;

an audio switching assembly adapted for directing a plurality of electrical signals from said compact disc player assembly to an associated one of said plurality of speakers;

an aluminum layer, said aluminum layer being dispersed across a surface of said compact disc, said aluminum layer having a ridge substantially positioned as to form a spiral extending from a central portion of said compact disc to an outer edge of said compact disc, said aluminum ridge having pits and lands positioned along a length of said aluminum ridge, said pits and lands representing binary information corresponding to an audio signal;

a second aluminum ridge, said ridge having pits and lands representing a first and second audio channels, said second aluminum ridge having pits and lands representing a third and fourth audio channels;

wherein said second aluminum ridge being positioned substantially parallel to said ridge and extending from a central portion of said compact disc to an outer edge of said compact disc;

wherein said compact disc having a second aluminum layer positioned on a second side of said compact disc, said second aluminum ridge being positioned on said second aluminum layer such that said aluminum layer is positioned on a first side of said compact disc and said second aluminum layer is positioned on a second side of said compact disc;

a first and second pick-up head, said first pick-up head being adapted for reading said pits and lands of said ridge representing said first and second audio channels;

said second pickup head being adapted for reading said pits and lands of said second aluminum ridge representing said third and fourth audio channels;

a plurality of audio amplifiers, each one of said audio amplifiers being for amplifying an associated electrical signal from a pick-up head for driving an associated one of said plurality of speakers;

wherein said audio switching assembly monitors an output of said second pick-up head; said audio switching assembly connecting said speaker associated with said third audio channel to said first audio output when no signal is presented by said second pick-up head, said audio switching assembly connecting said speaker associated with said fourth audio channel to said second audio output when no signal is presented by said second pick-up head; and wherein said plurality of speakers includes two speakers per audio channel whereby an enhanced reproduction of an audio image is provided to the user.

* * * * *